United States Patent [19]

Bye et al.

[11] 4,451,419
[45] May 29, 1984

[54] APPARATUS AND PROCESS FOR THE PRODUCTION OF PILE SURFACE ARTICLES

[75] Inventors: Donald J. Bye, Runcorn; Harold P. Stanistreet, Iontypool, both of England; Werner Lindenstruth, Oestringen, Fed. Rep. of Germany

[73] Assignee: Imperial Chemical Industries, PLC, London, England

[21] Appl. No.: 112,919

[22] Filed: Jan. 17, 1980

Related U.S. Application Data

[63] Continuation of Ser. No. 611,243, Sep. 8, 1975, Pat. No. 4,436,687, which is a continuation of Ser. No. 417,597, Nov. 20, 1973, abandoned.

[30] Foreign Application Priority Data

Dec. 4, 1972 [GB] United Kingdom .............. 55831/72

[51] Int. Cl.³ .............................................. B29C 17/02
[52] U.S. Cl. ................................... 264/164; 264/167; 264/544; 425/384; 425/DIG. 236

[58] Field of Search ...................... 264/164, 167, 544; 425/384, DIG. 236

[56]  References Cited

U.S. PATENT DOCUMENTS 4,000,230 12/1976 Brendel .......................... 264/164 X
4,065,245 12/1977 Brendel .......................... 264/164 X

FOREIGN PATENT DOCUMENTS 72-4910 4/1973 South Africa ...................... 264/164

Primary Examiner—Philip E. Anderson
Attorney, Agent, or Firm—Cushman, Darby & Cushman

[57] ABSTRACT

In a method and apparatus for making a pile-surfaced thermoplastic material by a tack-spin technique the laminate of backing web and adhered pile is hauled off from the heated drawing surface over a rod or bar which fixes the point at which the laminate separates from the heated drawing surface and which directs cooling fluid from an aperture in the rod or bar and onto the back of the backing web and into the fibril-forming area.

10 Claims, 5 Drawing Figures

APPARATUS AND PROCESS FOR THE PRODUCTION OF PILE SURFACE ARTICLES

This is a continuation of application Ser. No. 611,243 filed Sept. 8, 1975, now U.S. Pat. No. 4,436,687, which is a continuation of application Ser. No. 417,597 filed Nov. 20, 1973, abandoned.

The present invention relates to improvements in or relating to the production of pile surfaced articles.

It has already been proposed to produce a pile on the surface of a synthetic polymeric material by pressing the material against the surface of a heated roll and separating the material from the surface while cooling the material to below its softening point. In this way fibrils are drawn out from the surface of the sheet and the cooling action ensures that the major part of each fibril remains integral with the thermoplastic material. In the preferred mode of operation of this technique cold air or another cooling medium is blown into the nip formed between the heated roll and the thermoplastic material as the thermoplastic separates from the roll. It has also been proposed to feed the thermoplastic to the roll as a sheet and to feed a backing material with the thermoplastic in such a way that the thermoplastic and the backing material bond together under the influence of the heated roll.

In some of the previous proposals a pile surface is produced by forcing a thermoplastic into cavities in the surface of a roll and then separating the sheet from the roll so that the thermoplastic that has been forced into the cavities is drawn into fibrils. This type of process suffers from the disadvantage that expensive equipment having accurately machined rolls is required and that the techniques cannot satisfactorily be used to produce short piles since the shallow cavities required for short pile would tend to be clogged with thermoplastic material. Furthermore, the nature of the pile (ie. the fibril density and length) depends upon the depth and size of the cavities so that only one type of pile may be obtained using one particular roller. It has also been proposed that in techniques of this type the thermoplastic which is drawn into fibrils is cold drawn and oriented and it has been suggested that the material be stripped from the heated cavitied roll over a circular rod so that the polymer is pulled from the cavities in the roll. However, in this technique using a cavitied roller the angle at which the material moves away from the roller makes little difference to the density of the pile. An object of the present invention is to provide a wide range of pile surfaces and the invention relates to a process in which a pile surface is produced by holding a thermoplastic material against a substantially smooth surface held at a temperature above the melting point of the thermoplastic. Under these circumstances the thermoplastic melts and adheres weakly to the surface so that as the polymer is separated from the surface fibrils of the molten polymer are drawn out. Thus, in our process fibrils are formed between the surface and the thermoplastic rather than within cavities formed in the surface of a roll. Such a process is already known but objects of the present invention are to improve both the uniformity of pile produced by this type of process, to allow uniform piles to be produced at higher speeds that has hitherto been possible and to provide a versatile process which may readily be adapted to produce varying types of pile.

The length of the individual fibrils produced by our process depends upon the length that can be drawn out from the sheet before the fibrils break and also the position at which the fibrils break. Both these factors depend on the path the material takes as it separates from the roll and the rate at which the material moves away from the surface of the heated roll and the cooling that is achieved. The length of the fibrils that are produced depends upon the path the material takes as it moves away from the heated surface. The fibrils will begin to draw out at the point where the thermoplastic first moves away from the heated surface and will break off at the point where the speed and direction of the material and the temperature of the fibril prevents further stretching. In addition since the surface of the roll is at a temperature above the melting point of the polymer it is important that there be sufficient cooling in the area formed between the surface and the sheet to prevent the fibrils becoming totally welded together under the influence of the heated roll. For many applications it is important to have a short pile as this gives improved abrasion resistance. It has however hitherto proved difficult to obtain a short uniform pile since if a sheet takes its natural unimpeded direction when moving away from a substantially smooth heated roll the distance between the sheet and the roll gradually increases and the point at which the two separate varies thus producing a non-uniform pile. Furthermore, the restriction on the extent of cooling reduces the speed at which the process can be operated.

The point at which the material separates from the heated surface and the path the material will naturally adopt as it moves away from a substantially smooth heated surface depends upon the position of the haul off. If it is situated some distance from the surface the material adopts its natural radius of curvature according to the position of the haul off and we have found that this natural radius of curvature is generally too large to allow the material to move away from the heated surface sufficiently quickly to obtain a satisfactory product. This is particularly so when the thermoplastic material is provided with a backing material, particularly a non textile backing material such as paper which is one of our preferred backings as it allows easy handlability of the final product and is cheap. In addition we have found that if the material is withdrawn by a haul off means situated some distance from the heated surface then the exact position where the material leaves the surface tends to wander which produces a non-uniform product.

The present invention is therefore concerned with a versatile apparatus and process for controlling and improving the texture and uniformity of the pile which is produced by a process in which fibrils are drawn out from a thermoplastic material by pressing the thermoplastic against a substantially smooth surface held at a temperature which melts the thermoplastic and withdrawing the thermoplastic from the surface.

According to the present invention we provide an apparatus for the production of pile surfaced thermoplastic materials comprising a substantially smooth surface heated to above the softening temperature of the thermoplastic, means to hold a thermoplastic material against said heated surface, means to withdraw the material from the surface and means to cool the thermoplastic as it leaves the heated surface, wherein means are provided to control the path of the thermoplastic at it moves away from the heated surface.

In our preferred apparatus the substantially smooth heated surface is a roller which is heated internally to a temperature above the melting point of the thermoplastic. It is to be understood that within this specification the term substantially smooth includes surfaces which have a satin finish or have been shot or sand blasted but excludes surfaces in which definite cavities are formed into which the polymer is forced to form fibrils since with cavitied rolls it is not possible to obtain the wide range of pile types that can be achieved using the present invention. Examples of surfaces which fall within our definition include polished metal surfaces such as steel or chrome and satin finish metal rolls and sand blasted metal rolls and the rolls may be coated with non-stick materials such as polytetrafluoroethylene. The means which holds the thermoplastic against the heated surface may conveniently be a pressure roll or a belt although whichever system is used we prefer that the thermoplastic be held against the roll by a resilient material which allows a predetermined amount of compression as the material is held against the heated surface. Alternatively, if the thermoplastic is in film form it may be pressed against the heated surface by the tension in the film itself. A further possibility is that the thermoplastic may be held against the heated surface by the tension in a backing material which bears against the thermoplastic to hold it against the heated surface. In this type of process the backing may already be laminated to the thermoplastic or may become laminated thereto as the thermoplastic melts during its contact with the heated surface. We do however prefer to use ancilliary means such as a roller or a belt.

The means which cools the material is necessary to ensure that the fibrils which are drawn out from the sheet remain adhering to the thermoplastic and do not stick permanently to the heated surface. In addition it is important to have cooling to allow the process to be operated at increased speeds, the greater the speed used the greater the cooling needed for the production of any particular type of pile. Our preferred method of cooling is to use a jet of cold air which flows into the nip formed between the heated surface and the material as it moves away from the surface, cooling should be uniform and thus the jet should extend across the total width of this nip. We have found that the actual direction of the jet of cold air is important and it is also important to allow as free a circulation of the air as possible in the space between the heated surface and the material. We therefore prefer that the cooling air be directed from a narrow slit orifice of width less than 1 preferably less than ½ millimeter under a comparatively high pressure against the heated surface at a position just beyond the point where the pile separates from the surface in such a way that the jet is deflected by the surface into this space. Thus the combination of the position and direction of the cooling jet and the path the material takes as it moves away from the roll to a large extent determine the type of pile that can be obtained at any particular operating speed. The thermoplastic material may also be cooled from the side furthest away from the heated surface and in one embodiment of the invention the radius of curvature of the material is controlled by hauling it away from the heated surface over a suitably shaped bar and this may be internally cooled.

The optimum path that the thermoplastic material should adopt as it leaves the heated surface depends upon the thickness and nature of the thermoplastic material and the type of product required. We find however that for most products the path may be curved and an initial radius of curvature between 1½ millimeters and 8 millimeters is particularly suitable, if the radius is less than about 1 millimeter there is a danger that the product will be damaged; if however the radius is greater than about 8 millimeters the pile tends to be long and weak. We have also found that the path of the material may best be controlled by hauling the material off around a bar and in this way the path of the material may be controlled either by setting the bar at a predetermined distance from the heated surface or by positioning the bar close to the surface and selecting the shape of the bar so that the material takes the required path as it is hauled off over the bar. Small variations in the path of the material and thus a different pile structure may be achieved by simplying altering the distance of the bar from the surface. It is important that the bar be rigid to ensure uniform contact between the sheet and the heated roll. Accordingly, the shape of the bar should be chosen to provide both the required path of the sheet as it leaves the roll together with the necessary rigidity. The bar is therefore not necessarily of circular cross-section. This apparatus has the added advantage that it is extremely versatile as not only may the pile be altered by varying the distance of the bar from the roll but considerable variations in product may be achieved by altering the size and shape of the bar. In a further embodiment the bar may act as an air knife which cools the thermoplastic, in this embodiment the bar is provided with a slot or holes through which cooling fluid such as cold air may be directed onto the web.

We have found that the apparatus of the present invention is versatile as the texture of the pile obtained on the surface of the thermoplastic material may readily be altered by changing the path of the sheet of thermoplastic material as it separates from the heated roll, which may be achieved either by varying the actual radius of the means which controls the radius of curvature of the thermoplastic or by varying the distance between the means itself and the heated surface.

We have found that in a process in which the pile is formed against a substantially smooth surface there are several factors which effect the speed at which a satisfactory pile may be obtained. The optimum conditions for the production of any one type of pile depend upon the particular thermoplastic material however for any given thermoplastic faster speeds may be obtained the higher the temperature of the surface providing the pile may be well cooled as it is formed. Thus, subject to other process variations we prefer that the material be drawn sharply away from the surface of the heated surface leaving as large a space as possible between the material and the surface so that a cooling fluid such as cold air be blown into this large space which allows for good circulation and escape of the fluid. The space between the material and the heated surface depends upon the path of the material and hence the provision of a means which controls and reduces this radius of curvature and allows greater production speeds to be used. We also find that production rates may be further increased if the back of the web is cooled as it is parted from the heated surface. Accordingly, where the means which controls the radius of curvature of the sheet of thermoplastic as it moves away from the heated surface is a rod around which the material is withdrawn we prefer that it be internally cooled and/or be of a shape such that it can direct cooling gas such as cold air onto the back of the web.

The preferred apparatus of the present invention has the added advantage that the provision of the bar close to the heated surface ensures that the material always leaves the surface at the same position and without this control the point of separation tends to wander which can result in non-uniform pile.

Part of a typical apparatus according to the present invention is illustrated in FIG. 5 of the accompanying drawings which shows a heated roll 3 against which the thermoplastic material may be urged and a bar 7 around which the material may be hauled away from the heated roll and 11 is a cooling jet which directs a coolant between the roll 3 and the bar 7. The types of pile that may be obtained using this process depend upon the distance between the rod 7 and the roll 3 ($\delta$ as shown in FIG. 5), the distance between the cooling jet and the tangent to the roll (shown as X in FIG. 5), the height of the cooling jet 10 above the rod 7 (Y in FIG. 5) and the angle ($\theta$ in FIG. 5) at which the coolant is directed. However, we prefer that these variables be within the following limits, X between 0.5 and 40 millimeters Y between $-10$ and 20 millimeters (the negative value indicating that the jet is below the top of the rod 7)

$\delta$ between the thickness of the material passing through the gap between the roll 3 and the rod 7 and 25 millimeters greater than that thickness $\theta$ be between $-15°$ and $75°$ (the negative value indicating that the cooling jet is directed below the level of the top of the rod 7).

All these variables mentioned above may be varied independently or together to produce a desired type of pile surface from any particular thermoplastic material as is illustrated in the accompanying examples.

The present invention also provides a process for the production of a pile surfaced thermoplastic material comprising pressing a synthetic thermoplastic material into contact with a substantially smooth surface, held at a temperature above the softening point of the thermoplastic to melt the surface of the thermoplastic, separating the thermoplastic from the heated surface so that fibrils are drawn out from the thermoplastic and cooling the material as it so separates to below the softening temperature of the thermoplastic wherein the thermoplastic is hauled off from the heated surface over a device which controls the path of the material as it leaves the heated surface.

In our preferred process the synthetic thermoplastic material is in the form of a film and may be any of the well-known film forming materials. Examples of suitable materials include polyolefines, particularly high and low density polyethylene, polypropylene and olefine copolymers, polymers and copolymers of vinyl chloride, polymers and copolymers of styrene, polyesters and the various nylons. The choice of material will of course depend on the particular type of product that is required and the uses to which it is to be put.

It is also preferred that the thermoplastic material be provided with a backing to improve the stiffness and the handleability of the product. The thermoplastic may be laminated to the backing before it is fed to the heated surface or may be fed separately to the heated surface and laminated to the backing by the heat and pressures generated during our process. Alternatively, the material may be applied as powder or granules to a backing web which carries the material into contact with the heated surface where it is fused into a substantially continuous layer. The choice of backing material will depend upon the desired nature of the product but we prefer for economic reasons that the backing be paper. The use of paper as a backing presents problems as compared with meshed backings such as fabrics and open-celled foams since the surface of the paper has few points at which it can key to the thermoplastic and thus it is more difficult to achieve a good bond. Furthermore, when using an open mesh backing such as a fabric the material may be effectively cooled from the back which is not so with paper backing. Thus, when using paper as a backing the material must be cooled from the front as it separates from the surface and the more effective the cooling the higher the speeds that may be used. Our preferred method of cooling is to blow cold air into the gap between the heated surface and the thermoplastic and thus good circulation and escape of the cooling air is important for high production rates and thus the techniques of the present invention are most useful when paper is used as a backing. Polyethylene and paper is a particularly suitable combination from which to produce backed pile surfaced products and the feedstock may be separate sheets of paper and polyethylene or polyethylene coated paper. When the backing material is paper we prefer that the sheet be withdrawn from the heated surface over a bar having a radius of curvature between $1\frac{1}{2}$ millimeters and 5 millimeters. In particular when using polythene of one thousandth inch thick laminated to Kraft paper of 50 gram/sq. meter we prefer that the radius of curvature be about 2 millimeters. We have found that the techniques of our invention are especially useful in the production of paper backed products and the product obtained has a uniform pile and the fibrils are of a lamella structure rather than being formed from individual fibrils.

As previously mentioned the heated surface is conveniently a roller which may be polished, satin finished or sand blasted, the surface may also be coated with non-stick material such as polytetrafluorethylene. The cooling is necessary to ensure that the fibrils that are drawn out by the heated surface remain integral with the thermoplastic material rather than sticking to the heated surface and may readily be achieved by directing a blast of cooling fluid, particularly cold air into the nip formed between the heated surface and the thermoplastic material as it leaves the surface. However, we have found that in order to achieve the necessary cooling particularly when producing a paper backed polyethylene pile surfaced material the angle between the material and the tangent to the heated surface at the point where the material leaves the roller (known as the take-off angle) should preferably be between 10° and 70° preferably between 25° and 50° to allow the cooling air to reach the point where the material separates from the heated surface to achieve an acceptable pile at high production speeds and thus this is also dependent on suitable control of the path of the material as it leaves the surface. In addition, it is preferred that the haul off angle (angle B in FIG. 4) is sufficiently great to allow free flow of the cooling air thus preventing air becoming trapped which would lead to temperature fluctuations and a non-uniform product. In particular it is preferred that the haul off angle be greater than 90° especially when paper is used as the backing material.

The temperature at which the heated surface should be held depends upon the nature of the thermoplastic material. However, we have found that providing the temperature is not so high that the thermoplastic is adversely affected the higher the temperature the higher the production rates that may be used. We have found, for example, that roll surface temperatures between 200° C. and 220° C. are particularly suitable when processing low density polyethylene at speeds up to 3 meters/minute. The higher the roll temperature and production speed the greater the need to control the path of the material and cool the fibrils effectively to ensure that they separate from the heated surface at the desired point to give the required pile length. In addition with processes operating at these temperatures we prefer to cool the back of the web as it is withdrawn from the roll surface even when using a backing such as paper which has a low porosity. We have found that this back cooling improves the abrasion resistance of the pile and we particularly prefer to draw the web away from the roll over a suitably shaped internally cooled bar.

The thermoplastic material should be pressed against the heated surface and we have found that this may best be achieved using either a backing roll or a supporting belt. For example, the thermoplastic material may be passed through the nip formed between two rolls one of which is heated. We prefer that whatever backing is used it is resilient, and find that a rubber covered roll or a resilient belt is particularly useful. If desired, the backing material may be foamed, for example, polyurethane foam which will provide the necessary resilience during processing.

It is important that the pile be cooled as it separates from the substantially smooth heated roll to ensure that once the fibrils have been drawn out from the bulk of the thermoplastic they remain integral therewith. We prefer to cool by directing a jet of cold air into the nip between the roll and the thermoplastic as it is separating therefrom. For high speed processing the cooling should be effective as possible and thus it is important that the coolant be as free as possible to circulate in the gap between the roll and the web. We have found that the most effective cooling is achieved if the jet itself is some distance away from the space and the coolant deflected under high pressure into the space. In this way the physical presence of the jet does not impede the escaping coolant. In our preferred process the coolant is directed against the surface of the heated roll slightly beyond the position at which the web separates from the roll so that the coolant is deflected into the space between the web and the surface and may then escape. We also prefer that the coolant be directed under high pressure from a narrow slit orifice extending across the width of the web.

In our preferred process the heated surface is a substantially smooth surfaced roller heated to a temperature above the melting point of the thermoplastic from which the pile surface is to be produced and the material is withdrawn from the surface of the roll over a rod positioned at a distance between the thickness of the material being pressed (including any backing) and 25 millimeters greater than that distance and a coolant is directed under pressure into the gap formed between the roll and the thermoplastic from a jet positioned between 5 and 40 millimeters from the point on the roll opposite the device over which the material is withdrawn from the roll and between 20 millimeters above that point and 10 millimeters below that point. The angle at which the jet is directed depending upon the position of the jet but being no greater than 75° to the horizontal.

The principal feature of the process of the present invention is therefore the provision of a device which controls the path of the thermoplastic material as it leaves the heated surface. As mentioned the device should be positioned close to the heated surface and the device preferably provides an edge extending across the width of the roll so that the thermoplastic material may be hauled off along this edge. In this way the position of the edge relative to the haul off may be adjusted to define the take off angle which gives a simple technique for altering the pile length and density. We prefer that the guiding device be a rod, a square tube or an angle rod and that it may be internally cooled.

An apparatus and process of the present invention is illustrated by reference to the accompanying drawing which shows a film of thermoplastic material 1 and a backing material 2 being fed to a heated roll 3. The film is pressed against the heated roll by means of the continuous resilient belt 4 which is driven by passage around rolls 5 and 6 both of which are cold. The film and backing material remain close against roll 3 until they pass through the gap defined between the roll 3 and the guiding means 7. The material is then pulled sharply away from the roll 3 by the haul off rolls 8 and 9. In this way there is a wide angle between the web and the roll which allows good cooling due to the air jet 10 supplied from the nozzle 11.

Figure 1:
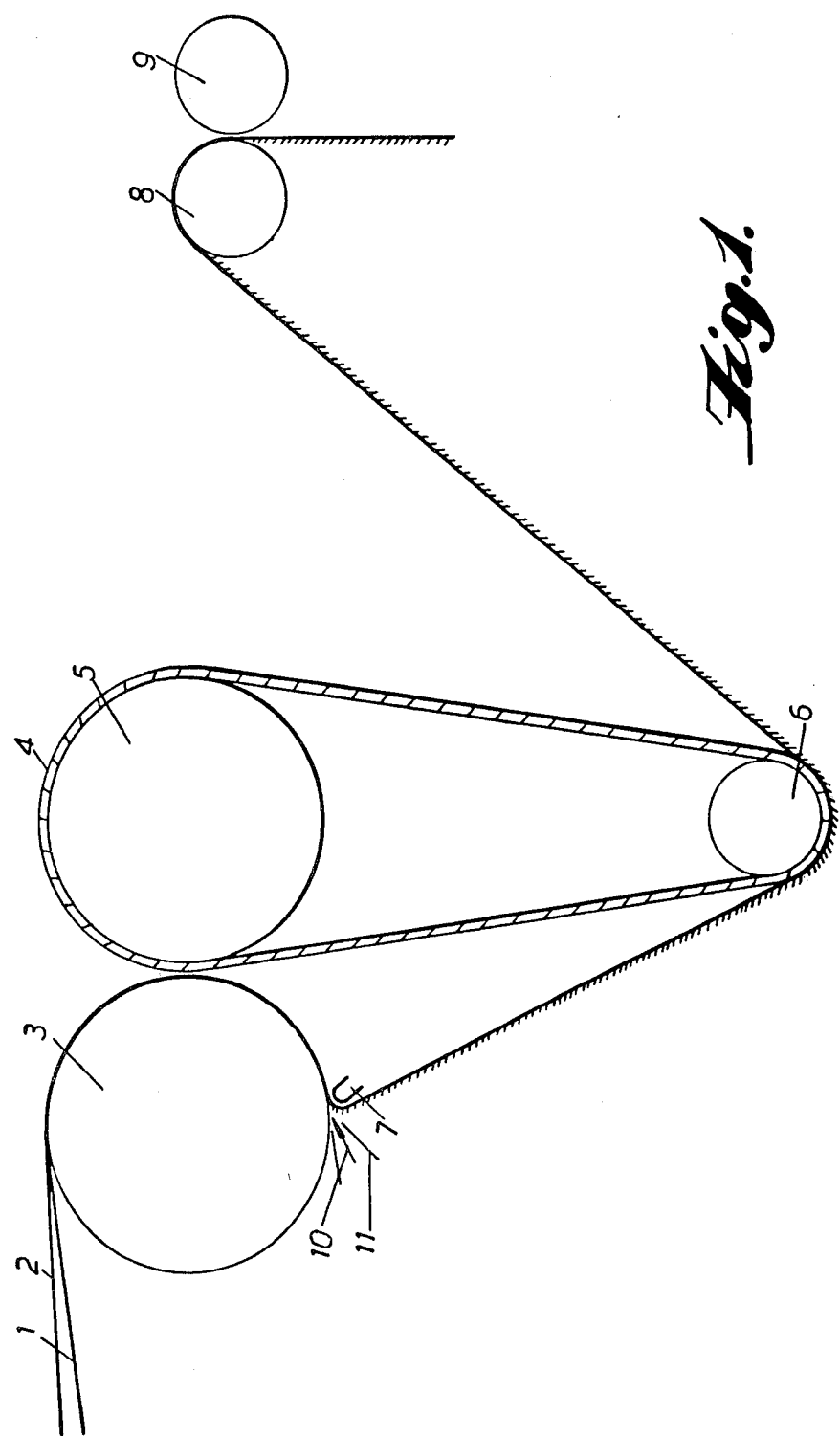
Figure 2:
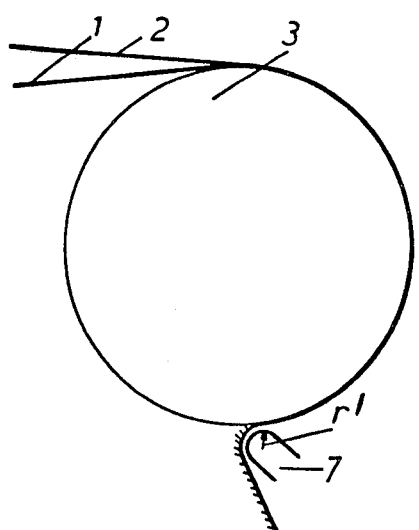
FIG. 2 illustrates how the radius of curvature of the web r' is controlled by the guiding means 7 compared with the situation of FIG. 3 when no guiding means is used.
Figure 3:
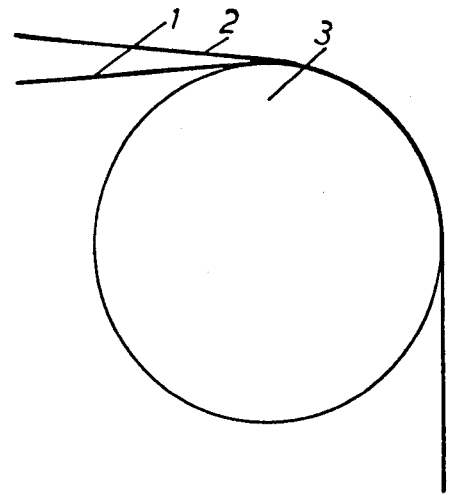
Figure 4:
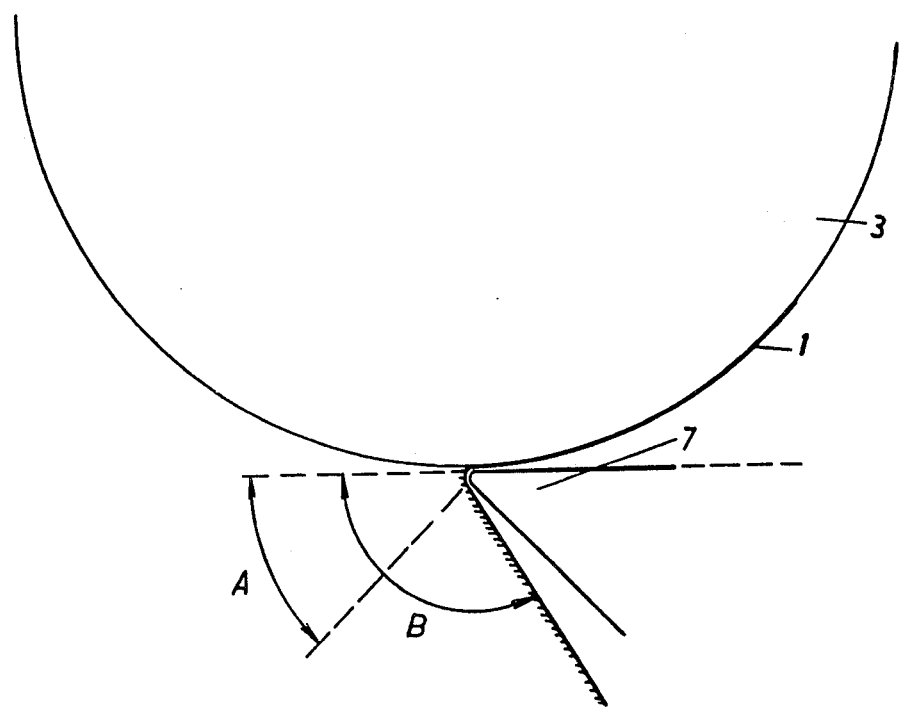
FIG. 4 is an enlarged illustration of the part of FIG. 1 where the sheet leaves the heated surface and is included to show which angles are referred to herein as the take-off angle and the haul off angle. Angle A being the take-off angle and B the haul off angle.

The present invention is further illustrated but in no way limited by the following examples in which pile surfaced materials were produced on apparatus substantially as illustrated in FIGS. 1, 2 and 4 of the accompanying drawings. The backing material 2 was Kraft paper and the thermoplastic 1 was a 65 micron film of low density polyethylene. Several runs were carried out using various values for the temperature of the roll 3 and the variables δ, X, Y and θ shown in FIG. 5, to assess the effect they have on the speed at which the process may be operated and the quality of the product.

EXAMPLE 1

The need to use the bar 7 was illustrated by two comparative experiments with all other variables kept constant but one run used no bar as is illustrated in FIG. 4 and in the other a bar of radius (r) 3 millimeters. It was found that a satisfactory pile surfaced product could not be obtained without a bar whereas once the bar was present a satisfactory pile was obtained.

EXAMPLE 2

The following conditions were adopted to assess the effect of cooling the bar 7 used in Example 1 on production speeds.

| Web Speed Meters/Minute | Roll Temperature | Peel Bar Temperature | Abrasion Resistance of Product |
| --- | --- | --- | --- |
| 1.50 | 216° C. | 100° C. | 85 |
| 1.50 | 216° C. | 20° C. | 155 |
| 2.60 | 206° C. | 100° C. | 91 |
| 2.60 | 206° C. | 20° C. | 114 |

Thus as may be seen cooling the peel bar increases the relative abrasion resistance to the product as measured by the Frankhauser test. It was also found that the maximum speed at which a satisfactory product could be obtained using a hot peel bar was 2.60 meters/minute but this could be increased with a cooled bar. Similar results were obtained when using different samples of film but it was also found that the presence of a pigment in the film and the quantity of pigment present also affects the maximum speed at which the process can be operated but with all samples the trend was the same as is illustrated in the above table.

EXAMPLE 3

Figure 5:
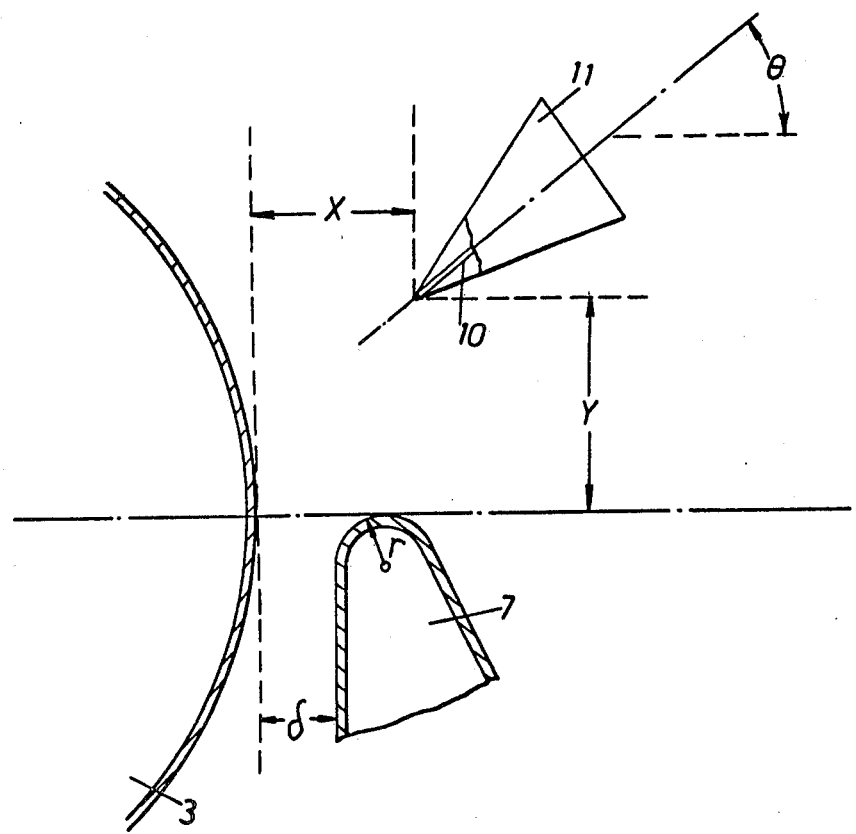
FIG. 5 is a further enlarged illustration of the part of FIG. 1 where the sheet leaves the heated surface showing in more detail the construction of the bar 7 and the air jet 11 together with details of the direction of the air jet, the material is omitted from this Figure to allow the other dimensions to be more clearly illustrated.

Polyethylene and paper were passed through an apparatus of the type illustrated in FIG. 5 at a speed of 2 meters per minute. With reference to FIG. 5 the operating conditions were as follows.

X = 18 millimeters
Y = 18 millimeters
δ = 13 millimeters
θ = 22° and product having a paper back with a pile length of about 5 millimeters was obtained which was found to be particularly suitable for the production of padded packaging materials such as those described in our French Pat. No. 7,220,716.

EXAMPLE 4

The process as described in Example 3 was repeated altering the variables as follows:

X = 3.2 millimeters
Y = 0.15 millimeters
δ = 0.4 millimeters
θ = 38° and the apparatus operated at 1.5 meters/minute. A very pleasing short pile fabric was obtained having a pile length of about 1 millimeter which could readily be used as a velvet replacement.

EXAMPLE 5

The process used was similar to Example 4 with the following settings:

X = 2.0 millimeters
Y = 5.0 millimeters
δ = 0.4 millimeters
θ = 30°

Hereagain a most pleasing velvet like pile surfaced fabrics with a fibril length of about 1.5 millimeters was obtained.

The above examples illustrate the versatability of the process and how that providing the bar 7 is present different pile structures may be obtained by simple adjustment of the other process variables.

We claim:

1. In a process for the production of a pile surfaced thermoplastic material comprising feeding a high porosity backing and a thermoplastic material to a substantially smooth surfaced roll in a manner such as to hold the front of the backing against the thermoplastic material and to hold the thermoplastic material in contact with the roll while holding the roll at a temperature above the softening point of the thermoplastic so that the thermoplastic bonds to the backing and adheres to the surface, separating the resulting laminate of the backing and the thermoplastic material from the heated surface so that fibrils are drawn out from the thermoplastic material between the backing and the surface in a fibril forming area, cooling the fibrils so formed to below the softening temperature of the thermoplastic and disjoining the fibrils from the heated surface the improvement wherein the thermoplastic material is hauled off sharply at an angle greater than 90 degrees from the heated surface along an edge extending across the width of the roll, said edge being provided by a rod or bar having a slot or holes therein and having a radius of curvature of between 1 and 8 millimeters at the point where the backing passes thereover, said rod or bar being positioned transverse to the direction of movement of the material and at a distance from the surface of the roll greater than the combined thickness of the thermoplastic material and the backing, said rod or bar fixing the point at which the thermoplastic separates from the surface and thereby controlling the direction of the path of the material as it moves away from the heated surface, said rod or bar being of a shape such that a stream of cooling fluid is directed through the slot or holes in the rod or bar into the back of the backing.

2. A process according to claim 1 in which the thermoplastic material is low density polyethylene.

3. A process according to claim 1 in which the material is further cooled as it separates from the heated surface by directing a gaseous coolant into the nip between the material and the heated surface.

4. A process as in claim 1 wherein the backing is a meshed backing.

5. An apparatus for the provision of pile surfaced materials comprising a roller having a substantially smooth cylindrical surface heated to above the softening temperature of the thermoplastic, means to hold the front of a backing web against a thermoplastic material and the thermoplastic material against said heated surface so that the thermoplastic adheres to the surface and bonds to the backing, means to withdraw the laminate of the backing and the thermoplastic from the surface, and a rod or bar situated close to the heated surface around which the laminate is withdrawn to stabilize the position of the thermoplastic as it leaves the heated surface and to control the path of the laminate, said rod or bar having a radius of curvature at the point where the web passes thereover between 1 and 8 millimeters directing cooling gas onto the back of the laminate as it moves away from the heated surface.

6. An apparatus according to claim 5 in which the roller has a satin finish.

7. An apparatus according to claim 5 containing additional means to cool the thermoplastic as it leaves the heated surface comprising a jet extending across the width of the web directed to blow a coolant into the nip formed between the heated surface and the material as it moves away from the surface.

8. An apparatus according to claim 6 in which the jet is directed against the heated surface at a point just beyond the point where the pile separates from the surface.

9. An apparatus for the production of pile surface materials comprising a heatable rotatable roller having a substantially smooth cylindrical surface, feed means for supplying thermoplastic to the heatable roller, means to feed a backing material with the thermoplastic, means to the hold the thermoplastic against the heated surface and the front of the backing against the thermoplastic, a rod or bar mounted at a distance from the surface of the roller which is between the thickness of the thermoplastic material combined with the thickness of the backing material and 25 millimeters greater than that distance, a jet mounted to direct cooling fluid onto the surface of the roll so that the cooling fluid is deflected into the space between the rod or bar and the roll, the outlet of said jet being between 10 millimeters in the opposite direction to that of rotation of the roll and 20 millimeters in the direction of rotation of the roll from the plane passing through the centre of the roll and being tangent to the rod and between 0.5 millimeters and 40 millimeters in a direction perpendicular to the tangent to the roll at the position where the roll surface cuts said plane, the jet delivering the coolant at an angle between 75° and −15° to said direction, and means to withdraw the thermoplastic and the backing from the heated surface over said rod or bar the radius of curvature of the rod or bar at the point where the web passees thereover being between 1 and 8 millimeters.

10. An apparatus as in claim 9 in which the air jet is of width less than 1 millimeter.

* * * * *